United States Patent Office 2,787,606
Patented Apr. 2, 1957

2,787,606

POLYMERIZATION OF ACRYLONITRILE IN THE PRESENCE OF PREFORMED HOMOPOLYMERS

Harry W. Coover, Jr., and Joseph B. Dickey, Kingsport, Tenn., assignors to Eastman Kodak Company, Rochester, N. Y., a corporation of New Jersey No Drawing. Application October 21, 1952, Serial No. 316,055

3 Claims. (Cl. 260—45.5)

This invention relates to the polymerization of acrylonitrile in the presence of preformed polymers, and to articles obtained therefrom.

In our copending application Serial No. 164,854, filed May 27, 1950 (now U. S. Patent 2,649,434, dated August 18, 1953), we have shown that valuable polymer products can be obtained by polymerizing acrylonitrile in the presence of homopolymers of acrylamides, itaconamides, citraconamides, esters of acrylic and methacrylic acids and vinyl carboxylic esters.

It has been previously proposed to polymerize acrylonitrile in the presence of polyvinyl resins, such as polyvinyl acetate (U. S. Patent 2,123,599, dated July 12, 1938). The polymers obtained according to the suggested method in U. S. Patent 2,123,599 can be used to prepare synthetic fibers, which are susceptible to many of the known organic dyes. A serious drawback with this method is that the fibers thus obtained have too low a softening temperature to be of commercial value, softening being observed at temperatures as low as 145° C.

Attempts have been made to increase the dyeability of polyacrylonitrile fibers by interpolymerizing acrylonitrile with certain monomers whose polymers have an affinity for dyes. While this procedure does give polymer products, from which fibers having good dyeing properties can be obtained, a serious drawback, such as that mentioned above, arises in certain instances, a substantial lowering of the softening point of the fiber being observed. For example, while an interpolymer of acrylonitrile and vinyl acetate containing about 80 percent by weight of acrylonitrile can be drawn into fibers susceptible to dyeing, the softening point of such fibers is too low for practical purposes, softening of the fibers being observed at about 150°–170° C.

Other attempts have been made to increase the dyeability of polyacrylonitrile fibers by mixing with the polyacrylonitrile, before spinning, other polymeric materials which are dye-susceptible. This procedure likewise provides fibers having good dyeing properties, however, many of these fibers show a low softening point, and in addition many show segmentation into their individual components along their horizontal axis. For example, it can be demonstrated that mixtures of polyvinyl acetate and polyacrylonitrile, when dissolved in either N,N-dimethylformamide or N,N-dimethylacetamide in proportions varying from 15 to 50 percent by weight of polyvinyl acetate based on the total weight of the mixed polyacrylonitrile and polyvinyl acetate, form grainy dopes which separate into two liquid layers on standing. This is also true of many other polymeric compounds, natural or synthetic, which are soluble in the above solvents. Fibers which form from these non-homogeneous solutions or mixtures of polyacrylonitrile and polyvinyl acetate are too low in softening temperature to be of practical value, and also are subject to the defect of segmentation. This is not surprising because of the non-homogeneous condition of the spinning solution and the fact that it is generally known that polyacrylonitrile is not compatible with many organic substances.

We have now made the unusual and valuable discovery that stable solutions of acrylonitrile polymers which do not separate into distinct layers on standing, and from which fibers of homogeneous character can be spun, can be prepared by polymerizing acrylonitrile in the presence of preformed polymers which have not been separated from their polymerization medium prior to the addition of monomeric acrylonitrile. These fibers are characterized by a softening point higher than the interpolymers referred to above, and do not exhibit the segmentation defect shown by many of the fibers prepared from certain prior art materials comprising polyacrylonitrile.

It is, therefore, an object of our invention to provide acrylonitrile polymer compositions. A further object of our invention is to provide methods for making these modified polymer compositions. Still another object is to provide homogeneous solutions obtained from these polymer compositions comprising acrylonitrile. Another object is to provide fibers from these homogeneous solutions, and methods for making these fibers. Other objects will become apparent from a consideration of the following description and examples.

According to our invention, we provide polymer compositions comprising acrylonitrile by polymerizing acrylonitrile in the presence of a preformed polymer which has not been separated from its polymerization medium prior to the addition of the acrylonitrile. When the preformed polymer is separated from its polymerization medium, and redissolved in a solvent, or suspended in an aqueous medium, all of the reactive groups in the polymer chain are apparently closed, or rendered inactive, and polymerization of the acrylonitrile with this separated polymer causes a substantial lowering of softening point in certain instances, such as with polyvinyl acetate. When the acrylonitrile is added to the preformed polymer before separation of the polymer from the reaction medium, a certain number of groups in the polymer chain apparently remain reactive, and the acrylonitrile is able to increase the length of the polymer chain. The compositions obtained according to our invention are not to be confused with simple interpolymers which have a low softening point as has been noted above.

The polymer compositions of our invention contain from 5 to 95 percent by weight of acrylonitrile and from 95 to 5 percent by weight of the other monomer from which the preformed homopolymer is obtained. Those of our compositions containing from about 60 to 95 percent by weight of acrylonitrile have been found to be especially useful as fiber-forming materials. However, all of our compositions in the 5 to 95 percent range of acrylonitrile are compatible with each other, with polyacrylonitrile, or with other acrylonitrile polymers containing at least 85 percent by weight of acrylonitrile, in all proportions, but the most useful mixtures are from 5 to 95 parts by weight of one or more of the polymers of the invention with from 95 to 5 parts by weight of polyacrylonitrile. Monomers, whose polymers were not heretofore compatible with polyacrylonitrile can thus be polymerized according to our invention to give polymers which are highly compatible with polyacrylonitrile.

The preformed polymers which are useful in practicing our invention can be prepared by polymerizing ethenoid unsaturation according to methods well known to the art. As ethenoid compounds, we have found that maleamides, fumaramides, maleamates, fumaramates, itaconamates and citraconamates are especially suitable for providing the compositions of the invention. When from 5 to 95 parts by weight of acrylonitrile is added to from 95 to 5 parts by weight of the homopolymer of one of the above ethenoid compounds and the mixture heated in the presence of a polymerization catalyst until the acrylonitrile is substantially polymerized, particularly useful compositions are obtained.

The maleamides which can advantageously be used in our invention are selected from those represented by the following general formula:

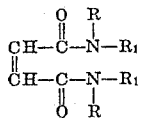

wherein R and $R_1$ each represents a hydrogen atom or an alkyl group containing from 1 to 4 carbon atoms (e. g. methyl, ethyl, propyl, isopropyl, n-butyl, isobutyl, etc. groups). Typical maleamides include maleamide, N-methyl maleamide, N-ethyl maleamide, N-propyl maleamide, N-isopropyl maleamide, N-n-butyl maleamide, N,N'-dimethyl maleamide, N,N'-diethyl maleamide, N,N'-di-n-butyl maleamide, N-methyl-N'-ethyl maleamide, N,N'-tetramethyl maleamide, N,N'-tetraethyl maleamide, N,N-dimethyl-N'-N'-diethyl maleamide, etc.

As fumaramides, we can advantageously use those represented by the following general formula:

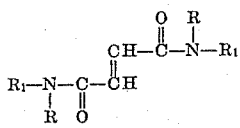

wherein R and $R_1$ are as above defined. Typical fumaramides include fumaramide, N-methyl fumaramide, N-ethyl fumaramide, N-propyl fumaramide, N-isopropyl fumaramide, N-n-butyl fumaramide, N,N'-dimethyl fumaramide, N,N'-diethyl fumaramide, N,N'-di-n-butyl fumaramide, N-methyl-N'-ethyl fumaramide, N-methyl-N'-butyl fumaramide, N,N-tetramethyl fumaramide, N,N'-tetraethyl fumaramide, N,N-dimethyl-N',N'-diethyl fumaramide, etc.

As maleamates, we can advantageously use those represented by the following general formula:

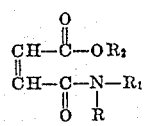

wherein R and $R_1$ are as above defined and $R_2$ represents an alkyl group containing from 1 to 4 carbon atoms. Typical maleamates include methyl maleamate, ethyl maleamate, propyl maleamate, n-butyl maleamate, N-methyl methyl maleamate, N-ethyl methyl maleamate, the N-methyl butyl maleamates, N-dimethyl methyl maleamate, N-dimethyl ethyl maleamate, N-dimethyl n-butyl maleamate, the N-dibutyl methyl maleamates, etc.

As fumaramates, we can advantageously use those represented by the following general formula:

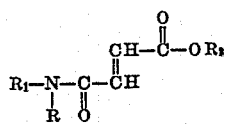

wherein R, $R_1$ and $R_2$ are as above defined. Typical fumaramates include methyl fumaramate, ethyl fumaramate, propyl fumaramate, n-butyl fumaramate, N-methyl methyl fumaramate, N-methyl ethyl fumaramate, the N-methyl butyl fumaramates, N-dimethyl methyl fumaramate, N-dimethyl ethyl fumaramate, N-dimethyl n-butyl fumaramate, the N-dibutyl methyl fumaramates, etc.

As itaconamates, we can advantageously use those represented by the following general formulas:

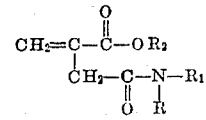

and

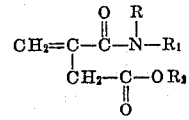

wherein R, $R_1$ and $R_2$ are as above defined. Typical itaconamates include methyl itaconamate, ethyl itaconamate, propyl itaconamate, the butyl itaconamates, N-methyl methyl itaconamate, N-methyl ethyl itaconamate, N-methyl propyl itaconamate, N-methyl n-butyl itaconamate, N-dimethyl methyl itaconamate, N-dimethyl ethyl itaconamate, N-dimethyl n-butyl itaconamate, the N-dibutyl methyl itaconamates, etc.

As citraconamates, we can advantageously use those represented by the following general formulas:

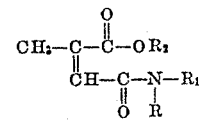

and

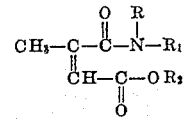

wherein R, $R_1$ and $R_2$ are as above defined. Typical citraconamates include methyl citraconamate, ethyl citraconamate, propyl citraconamate, the butyl citraconamates, N-methyl methyl citraconamate, N-methyl ethyl citraconamate, N-methyl propyl citraconamate, N-methyl n-butyl citraconamate, N-dimethyl methyl citraconamate, N-dimethyl ethyl citraconamate, N-dimethyl n-butyl citraconamate, the N-dibutyl methyl citraconamates, etc.

In preparing the polymer compositions of our invention, a monomer selected from those represented by the above general formulas is polymerized until homopolymerization is substantially complete, i. e. further heating produces no additional polymerization and the acrylonitrile monomer is then added and the polymerization continued until the acrylonitrile is substantially polymerized, i. e. from about 90 to 100 percent.

The polymerization can be accelerated by the use of a well-known polymerization catalyst. Such catalysts are commonly used in the art of polymerization, and our invention is not to be limited to any particular catalyst material. Catalysts which have been found to be especially useful comprise the peroxide polymerization catalysts, such as the organic peroxides (e. g. benzoyl peroxide, acetyl peroxide, acetyl benzoyl peroxide, lauryl peroxide, oleoyl peroxide, triacetone peroxide, urea peroxide, t-butyl hydroperoxide, alkyl percarbonates, etc.), hydrogen peroxide, perborates (e. g. alkali metal perborates, such as those of sodium and potassium, etc.), persulfates (e. g. alkali metal ammonium persulfate, etc. Other catalysts such as the ketazines, azines, etc. can be used. The quantity of catalyst used can be varied, depending on the monomer, amount of diluent, etc. Sufficient catalyst can be used to homopolymerize the ethenoid monomer selected from those represented by the above general formulas and the monomeric acrylonitrile, or an amount of catalyst sufficient to polymerize only the ethenoid monomer can be used, and additional catalyst can be added with the acrylonitrile monomer to complete the polymerization. The catalyst added along with acrylonitrile may be the same catalyst that was used to polymerize the other ethenoid monomer. We have found that it is especially advantageous to use an amount of catalyst sufficient to polymerize only the first monomer, and then upon addition of the acrylonitrile to add a further amount of catalyst at that time. This procedure provides a readier means for regulating the molecular weight distribution of the polymer composition.

The temperatures at which the process of our invention can be carried out vary from ordinary room temperature to the reflux temperature of the reaction mixture. Generally, a temperature of from 25° to 75° C. is sufficient.

If desired, emulsifying agents can be added to the reaction mixture to distribute uniformly the reactants throughout the reaction medium. Typical emulsifying agents include the alkali metal salts of certain alkyl acid sulfates (e. g. sodium lauryl sulfate), alkali metal salts of aromatic sulfonic acids (sodium isobutylnaphthalenesulfonate), alkali metal or amine addition salts of sulfosuccinic acid esters, alkali metal salts of fatty acids containing from 12 to 20 carbon atoms, sulfonated fatty acid amides, alkali metal salts of alkane sulfonic acids, sulfonated ethers (e. g. aryloxy polyalkylene ether sulfonates), etc.

The polymerization can be carried out in the presence of chain regulators, such as hexyl, octyl, lauryl, dodecyl, myristyl mercaptans, etc., which impart improved solubility properties to the polymer compositions. If desired, reducing agents such as alkali metal bisulfites (e. g. potassium, sodium, etc. bisulfites) can be added to reduce the time required for the polymerization to be effected.

The following examples will serve to illustrate further the manner whereby we practice our invention.

Example 1

9.7 g. of N,N'-dimethylfumaramide were suspended in 100 cc. of distilled water along with 0.1 g. of ammonium persulfate, 0.1 g. of sodium bisulfite, and 1 g. of a sulfonated ether type of emulsifying agent. The resulting emulsion was allowed to polymerize for 16 hours at 50° C. and then cooled down to room temperature. A solution of 0.5 g. of acrylonitrile, 0.01 g. of ammonium persulfate, and 0.01 g. of sodium bisulfite in 10 cc. of water was added and the polymerization completed by tumbling at 50° C. for 8 hours. The emulsion was broken by the addition of a concentrated salt solution, and the precipitated polymer was filtered, washed, and dried. On analysis, the polymer composition was found to contain 95 percent by weight of N,N'-dimethylfumaramide.

Fibers obtained from a mechanical mixture containing 30 percent by weight of the polymer obtained and 70 percent by weight of polyacrylonitrile, by extruding a solution of the mixture in N,N-dimethylformamide into a precipitating bath, had a tenacity of 3.4 g. per denier, an extensibility of 20 percent, a sticking temperature of 210° C., and shrank 9 percent in boiling water.

Example 2

2 g. of N,N,N',N'-tetramethylfumaramide was emulsified in 80 cc. of water containing 2 g. of potassium laurate, 0.02 g. of potassium persulfate and 0.02 g. of sodium bisulfite. The emulsion was allowed to polymerize for 16 hours at 25° C. There were then added 8 g. of acrylonitrile, 0.1 g. of potassium persulfate and 0.1 g. of sodium bisulfite, and the emulsion was allowed to polymerize for 8 hours at 25° C. The polymer product was then separated from the reaction mixture by filtration, yielding 9.2 g. On analysis the polymer was found to contain 21 percent by weight of N,N,N',N'-tetramethylfumaramide.

The polymers can be mixed with polyacrylonitrile in all proportions and dissolved to give stable solutions which do not separate into distinct layers on standing and from which fibers and films of homogeneous character can be spun, extruded or cast.

Example 3

2 g. of N,N'-di-isopropylfumaramide were suspended in 18 cc. of water along with 0.02 g. of ammonium persulfate, 0.02 g. of sodium bisulfite and 1.1 g. of a sulfonated ether type of emulsifying agent. The resulting emulsion was allowed to polymerize for 16 hours at 50° C., then cooled to room temperature, and a dispersion containing 8 g. of acrylonitrile, 0.1 g. of ammonium persulfate, 0.1 g. potassium bisulfite and 2 g. of a sulfonated ether (Triton 720) in 50 cc. of water were added. After tumbling the resulting emulsion at 50° C. for 2 hours, the polymer product was precipitated by the addition of a sodium chloride solution to give 9.8 g. of product containing 20 percent by weight of N,N-di-isopropylfumaramide.

Fibers obtained from a solution of a mechanical mixture of 5 parts polyacrylonitrile and 95 parts of the above polymer and extruding the solution into a precipitating bath, had a tenacity of 3.1 g. per denier, an extensibility of 20 percent, a sticking temperature of 215° C., and shrank only 7 percent in boiling water.

Example 4

2 g. of N,N'-diethylmaleamide were emulsified in 100 cc. of water containing 1.1 g. of a sulfonated ether type of emulsifying agent and 0.04 g. of potassium persulfate. The emulsion was heated at 50° C. for 16 hours, and the emulsion cooled to room temperature. There were then added 8 g. of acrylonitrile, 0.1 g. of potassium persulfate and 0.1 g. of sodium bisulfite. The reaction mixture was then allowed to stand at 25° C. for 16 hours. The precipitated polymer weighed 8.7 g. and contained 20 percent by weight of N,N'-diethylmaleamide.

Fibers were then spun by extruding a solution of the polymer in N,N-dimethylformamide into a precipitating bath. The fibers thus obtained had a tenacity of 3.3 g. per denier, an extensibility of 20 percent, a sticking temperature of 215° C., and shrank only 8 percent in boiling water. The fibers remained soft after being subjected to the usual dye-baths.

Contrasted with the fibers obtained above, fibers obtained from an interpolymer containing 20 percent by weight of N,N'-diethylmaleamide and 80 percent acrylonitrile had a tenacity of 2.3 g. per denier, an extensibility of 11 percent, a sticking temperature of 160° C., and shrank 27 percent in boiling water.

Example 5

2 g. of N,N'-dimethylmaleamide were suspended in 18 cc. of water along with 0.02 g. of ammonium persulfate, 0.02 g. of sodium bisulfite and 1.1 g. of a sulfonated ether type of emulsifying agent. The resulting emulsion was allowed to polymerize for 12 hours at 35° C., then cooled down to room temperature and added to a dispersion containing 8 g. of acrylonitrile, $\frac{1}{10}$ g. of ammonium persulfate, $\frac{1}{10}$ g. of sodium bisulfite and 2 g. of a sulfonated ether type of emulsifying agent in 50 cc. of water. After tumbling the reaction mixture at 50° C. for 2 hours, the polymer product was precipitated by the addition of an aqueous solution of sodium chloride to give 9.7 g. of polymer product containing 20 percent by weight of N,N'-dimethylmaleamide.

Fibers were then spun from the product obtained above by extruding a solution of the polymer in N,N-dimethylformamide into a precipitating bath. The fibers thus obtained had a tenacity of 3.5 g. per denier, an extensibility of 21 percent, a sticking temperature of 220° C., and shrank 8 percent in boiling water.

Fibers obtained from a solution of a mechanical mixture of 10 parts polyacrylonitrile and 90 parts of the above polymer and extruding the solution into a precipitating bath, had a tenacity of 3.6 g. per denier, an extensibility of 19 percent, a sticking temperature of 225° C., and shrank 6 percent in boiling water.

Example 6

2 g. of N-methylmethylfumaramate were emulsified in 50 cc. of water containing 1 g. of a sulfonated ether type of emulsifying agent and 0.05 g. ammonium persulfate. The resulting solution was heated at 50° C. for 12 hours, cooled to room temperature, and a mixture containing 8 g. acrylonitrile, 0.1 g. of ammonium persulfate and 0.1 g. sodium bisulfite were added. The reaction mixture was allowed to stand at 25° C. for 12 hours. The precipitated polymer weighed 9.4 g. and contained 19 percent by weight of N-methylmethylfumaramate.

Fibers obtained from this polymer had a tenacity of 3.2 g. per denier, an extensibility of 19 percent, a sticking temperature of 225° C. and shrank 8 percent in boiling water.

Fibers obtained from a solution of a mechanical mixture of 20 parts polyacrylonitrile and 80 parts of the above polymer and extruding the solution into a precipitating bath, had a tenacity of 3.4 g. per denier, an extensibility of 18 percent, a sticking temperature of 225° C., and shrank 6 percent in boiling water.

Example 7

4 g. of N,N-dimethylethylfumaramate were suspended in 40 cc. of water containing 0.04 g. of ammonium persulfate, 0.04 g. of sodium bisulfite and 2.2 g. of a sulfonated ether type of emulsifying agent. The resulting emulsion was allowed to polymerize for 16 hours at 50° C., then cooled to room temperature and a dispersion containing 6 g. of acrylonitrile, 0.1 g. potassium persulfate, 0.1 g. sodium bisulfite, and 2 g. of a sulfonated ether (Triton 720) in 50 cc. of water was added. There was thus obtained 9.4 g. of polymer product containing 43 percent by weight of N,N-dimethylethylfumaramate.

The polymers can be mixed with polyacrylonitrile in all proportions and dissolved to give stable solutions which do not separate into distinct layers on standing and from which fibers and films of homogeneous character can be spun, extruded or cast.

Example 8

1 g. of N-isopropylmethylmaleamide was emulsified in 10 cc. of water containing 0.5 g. of potassium laurate, 0.01 g. of potassium persulfate, and 0.01 g. of sodium bisulfite. The emulsion was heated for 12 hours at 35° C. and 19 g. of acrylonitrile, .1 g. of potassium persulfate, .1 g. of sodium bisulfite, and 2 g. of potassium laurate in 100 cc. of water were added and the polymerization was continued an additional 8 hours at 35° C. The precipitated polymer product was obtained in a 92 percent yield and contained 5 percent by weight of N-isopropylmethylmaleamide. It was soluble in N,N-dimethylformamide or N,N-dimethylacetamide. Fibers obtained from these solutions had a sticking temperature of 230° C.

The polymers can be mixed with polyacrylonitrile in all proportions and dissolved to give stable solutions which do not separate into distinct layers on standing and from which fibers and films of homogeneous character can be spun, extruded or cast.

Example 9

8 g. of N-methylmethylitaconamate were suspended in 80 cc. of water containing 0.1 g. of ammonium persulfate, 0.1 g. of sodium bisulfite, and 5 g. of a sulfonated ether type of emulsifying agent. The emulsion was allowed to polymerize for 16 hours at 50° C., at the end of which time polymerization seemed to be complete. The reaction mixture was then cooled and added to a dispersion containing 2 g. of acrylonitrile, 0.05 g. of ammonium persulfate, 0.05 g. of sodium bisulfite, and 1 g. of a sulfonated ether (Triton 720) in 30 cc. of water. After tumbling the reaction mixture for 4 hours at 50° C., there were obtained 9.7 g. of polymer containing 83 percent by weight of N-methylmethylitaconamate.

The polymers can be mixed with polyacrylonitrile in all proportions and dissolved to give stable solutions which do not separate into distinct layers on standing and from which fibers and films of homogeneous character can be spun, extruded or cast.

Example 10

2 g. of N,N-dimethylmethylitaconamate, 0.05 g. of potassium persulfate and 1 cc. of 7-ethyl-2-methylundecan-4-sulfonic acid sodium salt (Tergitol No. 4) were added to 30 cc. of water. The resulting emulsion was then tumbled at 50° C. for 12 hours at the end of which time 8 g. of acrylonitrile and 0.1 g. of potassium persulfate in 70 cc. of water were added. The reaction mixture was then tumbled for an additional 12 hours at 50° C. The resulting polymer was obtained in an 88 percent yield and contained 18 percent by weight of N,N-dimethylmethylitaconamate by analysis. It was soluble in either N,N-dimethylformamide or N,N-dimethylacetamide.

Fibers obtained from a solution of a mechanical mixture of 70 parts polyacrylonitrile and 30 parts of the above polymer and extruding the solution into a precipitating bath, had a tenacity of 3.2 g. per denier, an extensibility of 20 percent, a sticking temperature of 220° C., and shrank 7 percent in boiling water.

Example 11

3 g. of methylcitraconamate, 0.1 g. of ammonium persulfate, and 0.1 g. of sodium bisulfite and 1 g. of a sulfonated ether (Triton 720) were added to 50 cc. of distilled water. The resulting emulsion was then heated for 12 hours at 45° C. with tumbling. A solution of 17 g. of acrylonitrile, 0.2 g. of ammonium persulfate and 0.2 g. of sodium bisulfite in 50 cc. of distilled water was then added. The reaction mixture was then heated for an additional 8 hours at 35° C. The resulting polymer was obtained in an 89 percent yield and contained 15 percent by weight of methylcitraconamate by analysis.

Fibers obtained by extruding a solution of the polymer obtained in the above example in a solvent such as N,N-dimethylformamide into a precipitating bath had a tenacity of 3.9 g. per denier, an extensibility of 21 percent, a sticking temperature of 220° C. and shrank 7 percent in boiling water.

Fibers obtained from a solution of a mechanical mixture of 60 parts polyacrylonitrile and 40 parts of the above polymer and extruding the solution into a precipitating bath, had a tenacity of 4 g. per denier, an extensibility of 20 percent, a sticking temperature of 225° C., and shrank 7 percent in boiling water.

Example 12

9.5 g. of N-methylisopropylcitraconamate were suspended in 100 cc. of water containing 0.1 g. of ammonium persulfate, 0.1 g. of sodium bisulfite and 3 g. of a sulfonated ether type of emulsifying agent. The resulting emulsion was then tumbled for 8 hours at 50° C., and after cooling to room temperature, 5/10 g. of acrylonitrile, 0.05 g. of ammonium persulfate and 0.05 g. of sodium bisulfite were added. After tumbling the reaction mixture for an additional 3 hours, at 40° C., a polymer product was obtained containing 5 percent acrylonitrile by analysis.

The polymers can be mixed with polyacrylonitrile in all proportions and dissolved to give table solutions which do not separate into distinct layers on standing and from which fibers and films of homogeneous character can be spun, extruded or cast.

Example 13

9 g. of N,N-dimethylbutylcitraconamate were suspended in 100 cc. of water containing 0.1 g. of ammonium persulfate, 0.1 g. of sodium bisulfite and 2.5 g. of a sulfonated ether type of emulsifying agent. The resulting emulsion was then tumbled for 8 hours at 50° C., and after cooling to room temperature, 1 g. of acrylonitrile, 0.05 g. of ammonium persulfate and 0.05 g. of sodium bisulfite were added. After tumbling the reaction mixture for an additional 6 hours at 35° C., a polymer product was obtained which contained 9.8 percent acrylonitrile by analysis.

Fibers obtained from a solution of a mechanical mixture of 90 parts polyacrylonitrile and 10 parts of the above polymer and extruding the solution into a precipitating bath, had a tenacity of 3.4 g. per denier, an extensibility of 17 percent, a sticking temperature of 220° C., and shrank 7 percent in boiling water.

Example 14

20 g. of N-ethylmethylmaleamate were suspended in 150 cc. of water along with 0.2 g. of ammonium persulfate, 0.2 g. of sodium bisulfite and 4 cc. of 7-ethyl-2-methylundecan-4-sulfonic acid sodium salt (Tergitol No. 4). The resulting emulsion was heated for 16 hours at 50° C., and after cooling to room temperature, there were added 10 g. of acrylonitrile, 0.1 g. of ammonium persulfate and 0.1 g. of sodium bisulfite. The reaction mixture was heated for an additional 8 hours at 35° C. There was thus obtained a polymer in a 92 percent yield which contained 29 percent acrylonitrile by analysis.

Fibers obtained from a solution of a mechanical mixture of 80 parts polyacrylonitrile and 20 parts of the above polymer and extruding the solution into a precipitating bath, had a tenacity of 3.6 g. per denier, an extensibility of 21 percent, a sticking temperature of 220° C., and shrank 7 percent in boiling water.

As set forth in the preceding description and examples, the resinous compositions or polymers of the invention which have from 60 to 95 percent by weight of acrylonitrile in the polymer molecule are especially useful for preparing fibers from their solutions or dopes in the mentioned solvents by wet or dry spinning processes. Good quality fibers can also be spun from dopes comprising a mixture of one or more of the resinous compositions of the invention with polyacrylonitrile, when used in such proportions that the combined total of acrylonitrile in the mixture of components is in the range of 60 to 95 percent by weight. However, all of the resinous compositions or polymers of the invention, including mixtures of them with polyacrylonitrile in any proportions but preferably in the proportions of from 5 to 95 percent by weight of one or more of the polymers of the invention and from 95 to 5 percent by weight of polyacrylonitrile, can be made up into solutions or dopes with one or more of the mentioned solvents, with or without added fillers, pigments, dyes, plasticizers, etc., as desired, and the dopes coated onto a smooth surface to give flexible and tough films and sheet materials, which are useful for photographic film support and other purposes.

Other solvents which can be used for the preparation of fibers and coating compositions, etc., from the new resinous compositions or polymers of the invention, and mixtures thereof with polyacrylonitrile, include ethylene carbamate, ethylene carbonate, γ-butyrolactone, N-methyl-2-pyrrolidone, N,N-dimethyl methoxyacetamide, dimethyl cyanamide, N,N-dimethyl cyanoacetamide, N,N-dimethyl-β-cyanopropionamide, glycolonitrile (formaldehyde cyanohydrin), malononitrile, ethylene cyanohydrin, dimethylsulfoxide, dimethyl sulfone, tetramethylene sulfone, tetramethylene sulfoxide, N-formyl pyrrolidine, N-formyl morpholine, N,N'-tetramethylene tetramethylene methanephosphonamide, and the like. Generally speaking, we have found that N,N-dimethyl formamide and N,N-dimethyl acetamide are particularly advantageous solvents. The amount of polymer in the solvent for best spinning conditions can vary from about 5 to 20 percent although higher concentrations are possible at prohibitively high temperatures for practical spinning operations.

What we claim is:

1. A process for preparing resinous compositions comprising heating in the presence of a peroxide catalyst an aqueous dispersion of N-methyl methyl fumaramate, until the monomer has substantially completely homopolymerized, adding from 5 to 95 percent by weight of acrylonitrile based on the combined weights of the other monomer and acrylonitrile, and heating the reaction mixture until a substantial amount of the acrylonitrile has been polymerized.

2. A process for preparing resinous compositions comprising heating in the presence of a polymerization catalyst an aqueous dispersion of an alkyl fumaramate of not more than 16 carbon atoms wherein the said alkyl group contains from 1 to 4 carbon atoms and containing no substituent other than N-alkyl groups of from 1 to 4 carbon atoms, until the said alkyl fumaramate has substantially completely homopolymerized, adding from 5 to 95 percent by weight of acrylonitrile, based on the combined weights of the said alkyl fumaramate and the acrylonitrile, and heating the reaction mixture until a substantial amount of the acrylonitrile has been polymerized.

3. A modified resinous polymer containing from 5 to 95 percent by weight of acrylonitrile and having the structure and composition of a polymer obtained by the process of claim 1.

References Cited in the file of this patent

UNITED STATES PATENTS

| | | |
|---|---|---|
| 2,620,324 | Coover et al. | Dec. 2, 1952 |
| 2,649,434 | Coover et al. | Aug. 18, 1953 |
| 2,657,191 | Coover et al. | Oct. 27, 1953 |